US006439290B1

(12) United States Patent
Monti

(10) Patent No.: US 6,439,290 B1
(45) Date of Patent: Aug. 27, 2002

(54) DEVICE TO BE MOUNTED IN AN APPARATUS FOR COUPLING FABRICS BY MEANS OF A GLUE

(75) Inventor: Antonio Monti, Vicenza (IT)

(73) Assignee: Monti Antonio S.p.A., Vicenza (IT)

( * ) Notice: Subject to any disclaimer, the term of this patent is extended or adjusted under 35 U.S.C. 154(b) by 93 days.

(21) Appl. No.: 09/654,847

(22) Filed: Sep. 5, 2000

(30) Foreign Application Priority Data

Sep. 24, 1999 (IT) ........................................ VI99A0196

(51) Int. Cl.[7] ............................ B05C 1/08; B32B 31/02

(52) U.S. Cl. ........................ 156/578; 156/291; 118/261

(58) Field of Search ................................ 156/291, 578; 118/261, 262, 211, 212, 413

(56) References Cited

U.S. PATENT DOCUMENTS 3,762,365 A * 10/1973 Herzog ........................ 118/212
3,814,052 A * 6/1974 Caratsch ..................... 118/202
4,141,313 A * 2/1979 Hefele ........................ 118/212

* cited by examiner

*Primary Examiner*—Sam Chuan Yao
(74) *Attorney, Agent, or Firm*—Bucknam and Archer

(57) ABSTRACT

The improved racla device to be mounted in an apparatus for coupling fabrics by means of a glue, contains a reservoir for collecting the glue, a knurled roller and the reservoir is in contact with the surface of the knurled roller. Further the device is composed of a slab which is provided at its lower end with a metallic lamina which closes the bottom of the reservoir, while keeping always the contact with the surface of the roller.

4 Claims, 2 Drawing Sheets

DEVICE TO BE MOUNTED IN AN APPARATUS FOR COUPLING FABRICS BY MEANS OF A GLUE

FIELD OF THE INVENTION

This invention relates to the provision of an improvement in an apparatus for coupling fabrics by means of glue.

BACKGROUND OF THE PRIOR ART

In the field in which fabrics are worked, at present the working which provides for coupling reciprocally two superimposed fabrics provides for holding the fabrics together by means of an intermediate layer of a glue. The glue which is placed between the two fabrics to be coupled is constituted by a product which, due to the combined actions of heating and pressure, exercised by two cylinders on which the two fabrics are wrapped, is dissolved so as to form the intermediate binding agent.

In particular, the glue is deposited within the miniscule cavities present on the knurled surface of a rotating roller usually called "millepunti" on which one of the two fabrics to be coupled slides so that on the side of this fabric which comes in contact with the roller there are transferred micro-drops of glue which had filled the same cavities, thus forming the layer of glue interposed between the two fabrics. Afterwards, the second fabric is extended on top of the surface of the fabric covered by the micro-drops of glue and still subsequently, by means of the compressor cylinders, coupling occurs by reciprocal glueing of the two superimposed fabrics.

The deposit of the glue on the rotating roller is achieved by means of the so-called "racla" device, a device constituted by a suitably inclined blade forming an acute angle with the surface of the same roller so as to form a reservoir constantly filled with the product which is going to fill the cavities of the knurled surface of the same roller, which, in turn, rotating, deposits the product on the surface of the fabric to be treated.

In order to allow the glue which is in the form of very fine granules or as a powder, to be deposited in a regular and homogeneous manner in the interior of the cavities present on the surface of the knurled roller, it is necessary that the mass of glue be warmed in advance to a suitable temperature. At the present state of the art, the mass of glue is warmed by conduction of heat from the warmed rotating roller or by providing the same racla device with a circuit of diathermic oil.

SUMMARY OF THE INVENTION

An object of the present invention is to provide a racla device which guarantees a constant and regular distribution of the glue on the rotating knurled roller.

A further object is to provide a racla device in which the entire mass of the glueing product contained in the reservoir is maintained at the correct temperature.

Still another object is to provide a racla device which is maintained in contact with the surface of the rotating roller along the entire length of the roller thus exercising on this surface a regular pressure capable of avoiding automatic aiming incidents and ensuring simultaneously continuous cleanliness by scraping of the same surface, that is operating in a manner that the glue is deposited only in the interior of the cavities of the knurled roller and leaves clear the projections in the knurled roller.

The invention is now described in detail by reference to a particular embodiment provided herein as a non-limiting example, with the help of drawings, of which:

Figure 1:
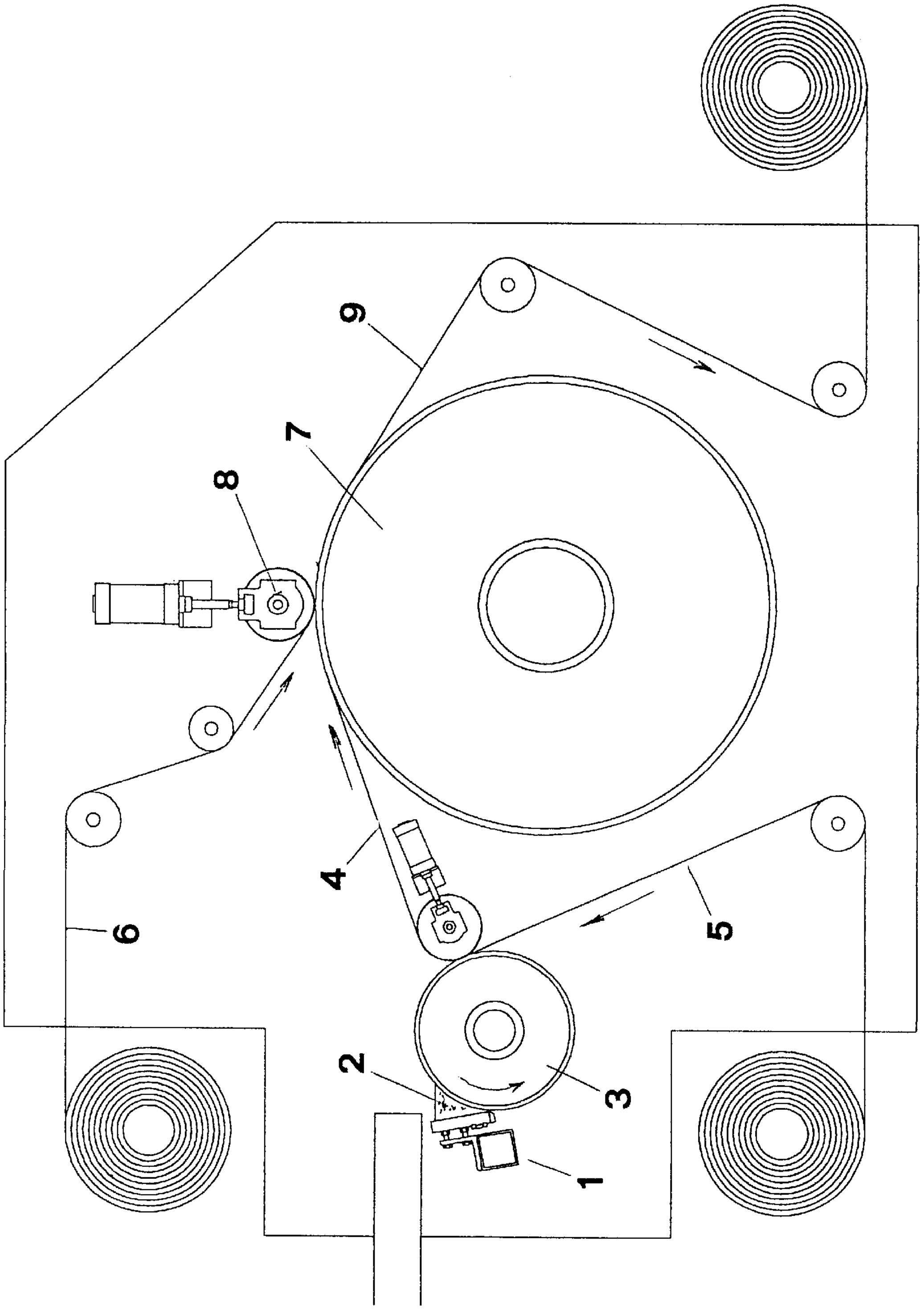
FIG. 1 is an elevational schematic view of the apparatus of the present invention.

As shown in FIG. 1, the racla device (1) creates a reservoir to contain the glueing product (2) which is deposited within the cavities present in the knurled roller (3), which rotating, deposits micro-drops of the glue on the surface (4) of a first fabric (5), the latter sliding in contact with the roller. A second fabric (6) subsequently places itself on top of this surface which is covered with micro-drops of glue to achieve the coupling due to the action of compression of the counterposed cylinders (7) and (8) and to obtain the fabric (9) having two layers.

Figure 3:
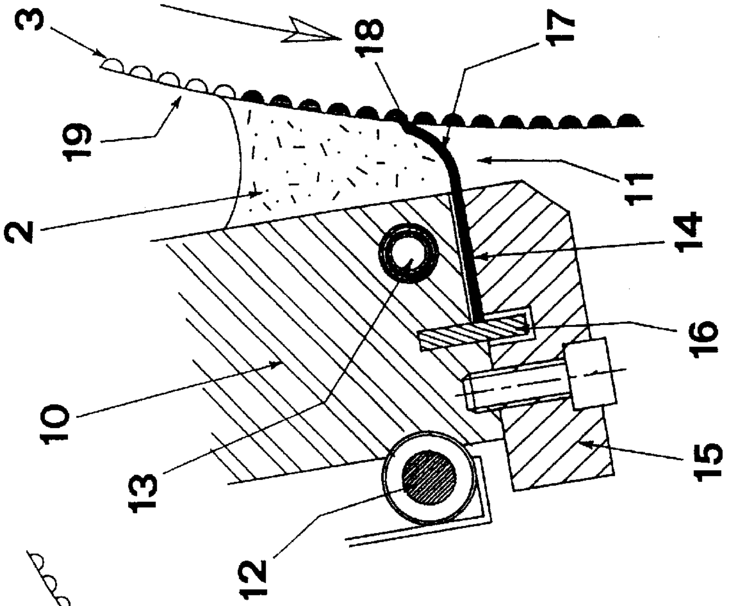
FIG. 3 is a detailed view of the area of contact between the racla device and the rotating roller.
Figure 2:
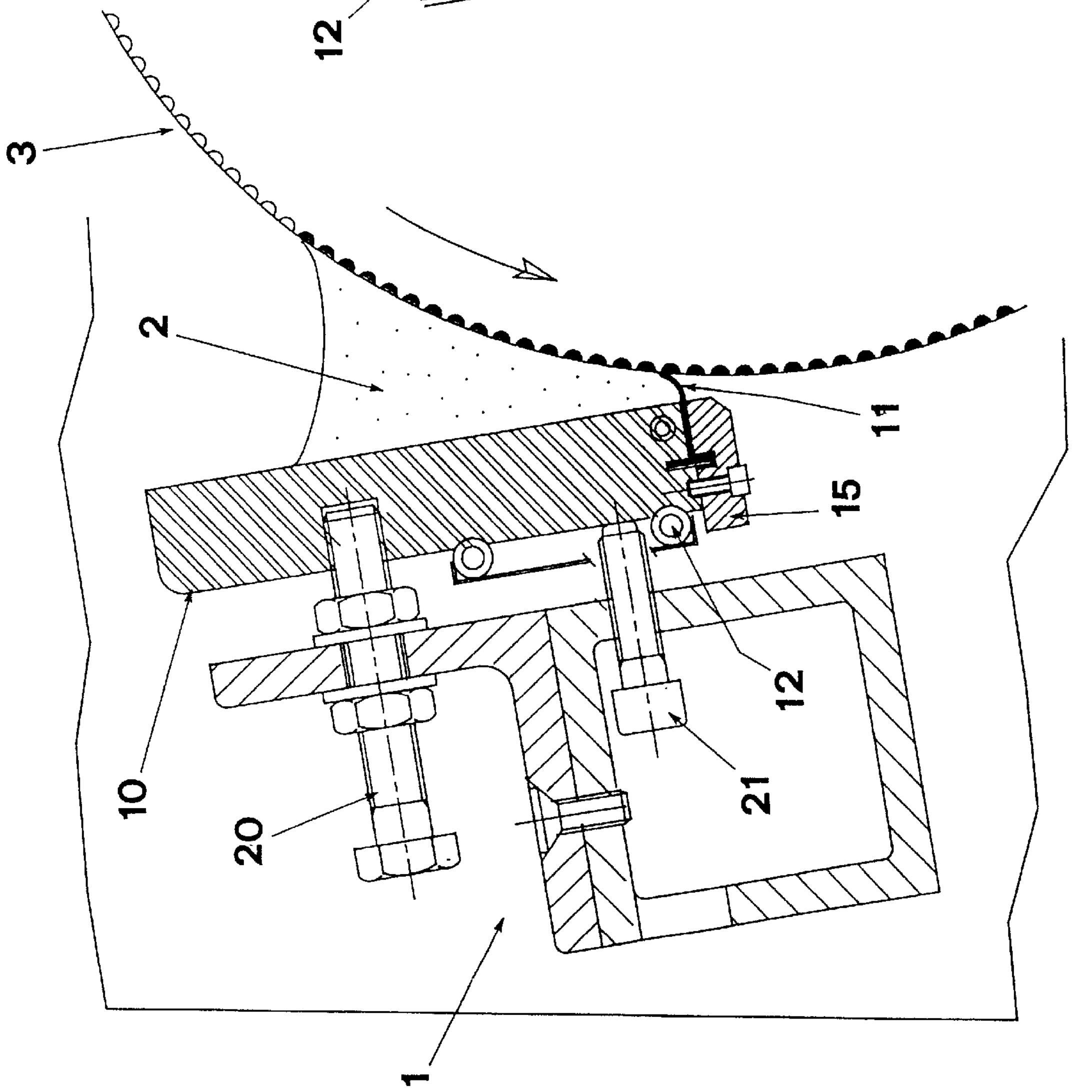
FIG. 2 is an elevational view in cross section of the racla device of this invention.

As shown in more detail in FIGS. 2 and 3, racla device (1) which forms the reservoir to collect the glue (2), the reservoir being placed in contact with the surface of the rotating knurled roller (3), is composed of a slab (10), which extends along the entire length of the roller, is provided at the lower end with a metallic lamina (11), which closes the bottom of the reservoir, always maintaining contact with the knurled surface of the roller.

The glue is maintained at the correct temperature by means of a package of electrical resistances (12), which package is applied on the terminal part of the slab and in opposition to the reservoir, while the temperature is controlled by means of probe (13), the latter being inserted in the body of the same slab.

Advantageously the slab (10) is made of a material having a high degree of thermal conductivity, such for example aluminum, to allow maximum transmission of heat by conduction on the entire mass of the glue.

The further novel characteristic of the invention provides that the metallic lamina (11) is made of a material having a high degree of elasticity such as for instance harmonic steel and that be of minimal thickness, in the order of a few tenths of a millimeter.

The flexible lamina (11) is supported by the slab (10) but it is removed from the slab because it is simply inserted and it is slidable within a seat (14) defined by the lower block (15) which is bonded to the base of said slab.

The height of the seat (14), obviously greater than the thickness of the lamina (11), is determined by spacer (16) which is substituted as a function of the thickness of said lamina.

In addition, lamina (11) is mounted on the racla device under conditions of compression, with the rear end placed against spacer (16) and the projecting end (17) which is curved with apex (18) being placed in contact with the surface (19) and in a direction opposite with respect to the direction of rotation of the roller.

Finally there is provided that on the support cross piece (20), in addition to the plurality of bolts (21) which anchor the slab (10), there is applied a plurality of screws (21), which are located in line along the entire length of the slab, perform the function of regulating and/or straightening the slab in order to avoid eventual deformations and curvatures which are due to the thermal deformation.

Obviously embodiments different from the embodiment shown in the figures are possible without departing from the claims of the present application.

What is claimed is:

1. An improved racla device for use with an apparatus for coupling two fabrics by means of a glue interposed therebetween, said glue being dissolved by the combined action of heat and pressure to from an intermediate bonding agent, said racla device being adapted to deposit glue on a knurled surface of a rotating roller which in turn deposits a layer of micro-drops of said glue on a surface of a first fabric which slides in contact with the knurled surface of said roller, a second fabric is placed in contact with the glue covered surface of said first fabric and the two fabrics are pressed together and coupled by the compression action of two counterposed cylinders so as to form a fabric with two layers, said racla device comprising:

a) a slab (10) extending the length of said knurled roller (3);

b) a metallic lamina (11) being removably supported at a lower end of said slab (10), said metallic lamina (11) being formed of harmonic steel having a high degree of elasticity and a thickness in the range of a few tenths of a millimeter;

c) a lower block (15) secured to a base of said slab (10) and defining a seat (14) therewith for slidably receiving said metallic lamina (11), the height of said seat (14) being determined by a spacer (16) which is substituted as a function of the thickness of said metallic lamina (11);and d) a package of electrical resistances (12) applied on a terminal part of said slab (10) for maintaining said glue at a correct temperature, whereby said metallic lamina (11) is mounted in said seat (14) under compression conditions with a rear end thereof placed against said spacer (16) and a protruding end (17) which is curved with an apex (18) placed in contact with the knurled surface (19) of knurled roller (3) in a direction opposite with respect to the direction of rotation of said knurled roller so that an action of cleaning by scraping on the knurled surface (19) is achieved, and whereby a reservoir for collecting said glue and being in contact with the knurled surface (19) of knurled roller (3) is formed bv said slab (10) and said protruding end (17) of said metallic lamina (11).

2. The improved racla device as defined in claim 1, which further includes a probe (13) inserted in said slab (10) for controlling the temperature of the glue contained bin the reservoir.

3. The improved racla device as defined in claim 1, wherein said slab (10) is formed of a high thermal conductive material such as aluminum to allow maximal conduction of the heat produced by the electrical resistances (12) to the glue contained in the reservoir.

4. The improved racla device as defined in claim 1, which further comprises a support crosspiece (20) for supporting said slab (10) with bolts (21) and a plurality of screws placed in line and extending the length of said slab (10) for regulating and straightening said slab so as to avoid deformations and curvatures as a result of thermal deformation.

* * * * *